United States Patent
Wang (10) Patent No.: US 11,210,743 B2
(45) Date of Patent: Dec. 28, 2021

(54) BLOCKCHAIN-BASED DATA PROCESSING SYSTEM, METHOD, COMPUTING DEVICE AND STORAGE MEDIUM

(71) Applicant: ADVANCED NEW TECHNOLOGIES CO., LTD., Grand Cayman (KY)

(72) Inventor: Mingliang Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/854,186

(22) Filed: Apr. 21, 2020

(65) Prior Publication Data

US 2020/0250764 A1 Aug. 6, 2020

Related U.S. Application Data

(63) Continuation of application No. PCT/CN2020/071392, filed on Jan. 10, 2020.

(30) Foreign Application Priority Data

Apr. 23, 2019 (CN) .......................... 201910329718.8

(51) Int. Cl.
*G06Q 10/10* (2012.01)
*G06Q 40/08* (2012.01)
(Continued)

(52) U.S. Cl.
CPC ........... *G06Q 40/08* (2013.01); *H04L 9/0637* (2013.01); *G06Q 10/063112* (2013.01)

(58) Field of Classification Search
CPC .... G06Q 40/08; G06Q 10/0635; G06Q 10/10; G06Q 30/0207; G06Q 40/06;
(Continued)

(56) References Cited

U.S. PATENT DOCUMENTS

| 8,103,580 B2 | 1/2012 | Sato et al. |
| 8,660,862 B2 | 2/2014 | Patterson et al. |

(Continued)

FOREIGN PATENT DOCUMENTS

| CA | 3055829 A1 | 9/2018 |
| CN | 106204287 A | 12/2016 |

(Continued)

OTHER PUBLICATIONS

STIC EIC NPL Search Report include Patent, ProQuest, IP.com, Dialog, dated May 27, 2021 (Year: 2021).*

(Continued)

*Primary Examiner* — Hai Tran (57) ABSTRACT

A system, method, computing device, and storage medium for blockchain-based data processing. The method comprises: obtaining, from a blockchain node, case information associated with cases; receiving a request for reviewing a target case, the request comprising identity information of a user and identification information of the target case; identifying target case case information from the case information based on the identification information of the target case; determining members satisfying conditions for reviewing the target case based on the identity information of the user and the target case case information; providing a review channel for reviewing the target case to each of computing devices respectively associated with one or more of the determined members; receiving, from the computing devices associated with the one or more of the determined members, case review data generated from review of the target case; and uploading the case review data to the blockchain node.

18 Claims, 4 Drawing Sheets

(51) Int. Cl.
*H04L 9/06* (2006.01)
*G06Q 10/06* (2012.01)

(58) Field of Classification Search
CPC ...... G06Q 40/02; G06Q 50/16; G06Q 20/102; G06Q 10/06; G06Q 10/1057; G06Q 30/018; G06Q 10/04; G06Q 10/063; G06Q 10/063118; G06Q 10/06393; G06Q 10/083; G06Q 10/0832; G06Q 10/0834; G06Q 10/0835; G06Q 10/20; G06Q 20/14; G06Q 20/223; G06Q 20/4016; G06Q 20/405; G06Q 30/012; G06Q 30/0202; G06Q 30/0206; G06Q 30/0283; G06Q 30/0643; G06Q 30/0645; G06Q 40/025; G06Q 50/01; G06Q 50/163; G06Q 10/047; G06Q 10/063112; G06Q 10/063114; G06Q 10/0639; G06Q 10/06398; G06Q 10/0833; G06Q 10/103; G06Q 10/105; G06Q 10/1053; G06Q 10/1095; G06Q 10/30; G06Q 20/02; G06Q 20/145; G06Q 20/29; G06Q 20/308; G06Q 20/3223; G06Q 20/3224; G06Q 20/3274; G06Q 20/3276; G06Q 20/36; G06Q 20/382; G06Q 20/401; G06Q 20/4012; G06Q 2220/00; G06Q 2240/00; G06Q 30/02; G06Q 30/0201; G06Q 30/0218; G06Q 30/0225; G06Q 30/0231; G06Q 30/0237; G06Q 30/0241; G06Q 30/0277; G06Q 30/0278; G06Q 30/04; G06Q 30/06; G06Q 30/0601; G06Q 40/00; G06Q 40/12; G06Q 40/123; G06Q 50/02; G06Q 50/165; G06Q 99/00
USPC .......................................................... 705/4
See application file for complete search history.

(56) References Cited

U.S. PATENT DOCUMENTS

| | | | |
|---|---|---|---|
| 2006/0184452 | A1 | 8/2006 | Barnes et al. |
| 2014/0304010 | A1 | 10/2014 | Kennedy et al. |
| 2016/0283941 | A1* | 9/2016 | Andrade ............... H04L 9/3247 |
| 2017/0103472 | A1* | 4/2017 | Shah ................... G06K 9/00597 |
| 2017/0178208 | A9 | 6/2017 | Shaaban et al. |
| 2018/0075527 | A1 | 3/2018 | Nagla et al. |
| 2018/0096175 | A1 | 4/2018 | Schmeling et al. |
| 2018/0158049 | A1 | 6/2018 | Jackson |
| 2018/0337882 | A1* | 11/2018 | Li ........................... H04L 61/35 |
| 2019/0172572 | A1 | 6/2019 | Piron et al. |
| 2019/0197622 | A1 | 6/2019 | Molinari et al. |
| 2019/0354964 | A1* | 11/2019 | Snow ...................... G06F 21/64 |
| 2020/0044857 | A1* | 2/2020 | Snow ................... G06Q 20/367 |
| 2020/0058381 | A1* | 2/2020 | Patel ...................... G16H 10/60 |

FOREIGN PATENT DOCUMENTS

| | | |
|---|---|---|
| CN | 108280628 A | 7/2018 |
| CN | 108520456 A | 9/2018 |
| CN | 108629565 A | 10/2018 |
| CN | 108805721 A | 11/2018 |
| CN | 109102247 A | 12/2018 |
| CN | 109243045 A | 1/2019 |
| CN | 109377395 A | 2/2019 |
| CN | 109543447 A | 3/2019 |
| CN | 109584082 A | 4/2019 |
| CN | 110263085 A | 9/2019 |
| TW | 201903682 A | 1/2019 |
| TW | M574295 U | 2/2019 |
| WO | 2017173399 A1 | 10/2017 |
| WO | 2018140963 A1 | 8/2018 |
| WO | WO-2019041912 A1 * | 3/2019 ............. G06Q 40/08 |
| WO | WO-2019052221 A1 * | 3/2019 ............. G06Q 40/08 |
| WO | 2019196550 A1 | 10/2019 |

OTHER PUBLICATIONS

First Search for Chinese Application No. 201910329718.8 dated Apr. 3, 2020.

First Office Action for Chinese Application No. 201910329718.8 dated Apr. 14, 2020.

Written Opinion and International Search Report for PCT Application No. PCT/CN2020/071392 made available to public on Oct. 29, 2020.

Search Report for Taiwanese Application No. 109100426 dated Jan. 14, 2021.

* cited by examiner

BLOCKCHAIN-BASED DATA PROCESSING SYSTEM, METHOD, COMPUTING DEVICE AND STORAGE MEDIUM

CROSS-REFERENCE TO RELATED APPLICATION

This application is a continuation application of International Patent Application No. PCT/CN2020/071392, filed on Jan. 10, 2020, which is based on and claims priority to and benefit of Chinese Patent Application No. 201910329718.8, filed with China National Intellectual Property Administration (CNIPA) of People's Republic of China on Apr. 23, 2019. The entire contents of all of the above-identified applications are incorporated herein by reference.

TECHNICAL FIELD

The specification relates to the field of blockchain technologies, and in particular, to a blockchain-based data processing system, method, computing device, and computer readable storage medium.

BACKGROUND

As the general public becomes more aware of insurance, more and more people purchase insurance. To facilitate the general public for purchasing insurance, more and more Internet insurance applications have been developed.

In the current technologies, reviewing the cases of Internet insurance claims by juries typically has the following steps. First, a user initiates a request for jury trial regarding the user's case in which a claim has been rejected by an insurance company, and submits claim materials. Then, the insurance company fills out reasons for the claim rejection and investigation materials. Last, jurors make their own determination with regard to the information submitted by both parties, and vote, on an Internet platform, to decide whether to support the claims of the user.

However, the review of insurance claims by juries in the current technologies has some disadvantages. Due to unreliability of regular Internet platforms, it is impossible to guarantee the correctness of results of votes cast by jurors, and thus it is impossible to guarantee fairness and accuracy of case review results.

SUMMARY

In view of this, embodiments of the specification provide a blockchain-based data processing system, method, computing device and computer readable storage medium, so as to solve the technical defects of the current technologies.

According to a first aspect of the embodiments of the specification, a blockchain-based data processing system is provided. The system may comprise a processor and a non-transitory computer-readable storage medium storing instructions executable by the processor to cause the system to perform operations. The operations may comprise: obtaining, from a blockchain node, case information associated with a plurality of cases; receiving a request for reviewing a target case among the plurality of cases, the request comprising identity information of a user and identification information of the target case; identifying case information associated with the target case from the case information associated with the plurality of cases based on the identification information of the target case; determining a plurality of members satisfying one or more conditions for reviewing the target case based on the identity information of the user and the case information associated with the target case; providing a review channel for reviewing the target case to each of one or more computing devices respectively associated with one or more of the determined members; receiving, from the one or more computing devices associated with the one or more of the determined members, case review data generated from review of the target case; and uploading the case review data to the blockchain node.

Optionally, the operations may further comprise obtaining the identity information of the user and the identification information of the target case in the case review request, and uploading, according to a preset data model, the identity information of the user and the identification information of the target case to the blockchain node.

Optionally, the operations may further comprise sending a plurality of invitations to the plurality of determined members for participating in case review, and receiving a confirmation from each of the one or more of the determined members.

Optionally, providing a review channel for reviewing the target case to each of one or more computing devices respectively associated with one or more of the determined members may comprise displaying the case information of the target case in the review channel.

Optionally, determining a plurality of members satisfying one or more conditions for reviewing the target case may comprise sending a case review authorizing request to the blockchain node, the case review authorizing request carrying unique identification information of the determined members, and receiving an authorization result notification returned by the blockchain node.

Optionally, determining a plurality of members satisfying one or more conditions for reviewing the target case may comprise identifying a plurality of members each having one or more characteristics similar to the user.

Optionally, the operations may further comprise subsequent to uploading the case review data to the blockchain node, closing the review channel for each of the one or more computing devices associated with the one or more of the determined members.

According to another aspect of the embodiments of the specification, a blockchain-based data processing system is provided. The system may comprise a requesting client, a transaction terminal, a server, and at least two blockchain nodes on a blockchain, wherein the requesting client is configured to send a case review request to the transaction terminal, the case review request carrying identity information of a user and identification information of a to-be-reviewed case; the transaction terminal is configured to receive the case review request, determine a program member satisfying a review condition according to the identity information of the user and the identification information of the to-be-reviewed case, provide the program member satisfying the review condition with a review channel for reviewing the to-be-reviewed case, receive case review data generated from the review of the to-be-reviewed case by the program member, and upload the case review data to the blockchain node; and the server is configured to pull the case review data from the blockchain node, determine a case review result according to the case review data, and return the case review result to the requesting client.

Optionally, the transaction terminal is further configured to obtain the identity information of the user and the identification information of the to-be-reviewed case carried in the case review request, and upload, according to a preset data model, the identity information of the user and the identification information of the to-be-reviewed case to the blockchain node; and the blockchain node is configured to receive the identity information of the user and the identification information of the to-be-reviewed case, update review status information corresponding to the to-be-reviewed case, and spread the identity information of the user, the identification information of the to-be-reviewed case, and the corresponding review status information to other blockchain nodes.

Optionally, the blockchain node is further configured to obtain a review status corresponding to the to-be-reviewed case according to the identity information of the user and the identification information of the to-be-reviewed case; if the review status corresponding to the to-be-reviewed case is not reviewed, update the review status to under review, and if the review status corresponding to the to-be-reviewed case is under review or reviewed, send prompt information of an abnormal review status to the transaction terminal.

Optionally, the server is further configured to upload case information of the user to the blockchain node; the blockchain node is further configured to receive and store the case information; and the transaction terminal is further configured to pull the case information from the blockchain node according to a preset pulling manner and store the case information locally.

Optionally, the transaction terminal is further configured to locally obtain information of the to-be-reviewed case according to the identity information of the user and the identification information of the to-be-reviewed case; determine an eligible program member according to the identity information of the user and the information of the to-be-reviewed case, and treat the eligible program member as a first case review member; and send an invite to participate in the case review to the first case review member, and treat a first case review member who responds with a confirmation to participate in the case review as a second case review member.

Optionally, the transaction terminal is further configured to provide the second case review member with a review channel and the information of the to-be-reviewed case, receive case review data generated from the review of the information of the to-be-reviewed case by the second case review member, and upload the review data to the blockchain node.

Optionally, the transaction terminal is further configured to send a case review authorizing request to the blockchain node, the case review authorizing request carrying unique identification information of the second case review member; and the blockchain node is further configured to receive the case review authorizing request, the case review authorizing request carrying the unique identification information of the second case review member, verify the unique identification information of the second case review member, and when the verification is successful, send a notification of successful authorization to the transaction terminal.

Optionally, the server is further configured to obtain the case review data, and determine a percentage of the amount of review data with the review result being approval in the total amount of the review data, if the percentage is greater than a preset threshold, the review result being that the review is successful, and if the percentage is lower than or equal to the preset threshold, the review result being that the review is failure, and if the review result is that the review is failure, send the review result to the requesting client.

Optionally, the server is further configured to carry out, if the review result is that the review is successful, processing on the case of the user according to data in the information of the to-be-reviewed case.

Optionally, the server is further configured to send the case review result to the blockchain node; and the blockchain node is further configured to receive the case review result, update the review status of the case of the user, and spread updated case status information to other blockchain nodes.

According to a second aspect of the embodiments of the specification, a blockchain-based data processing method is provided. The method may comprise: obtaining, from a blockchain node, case information associated with a plurality of cases; receiving a request for reviewing a target case among the plurality of cases, the request comprising identity information of a user and identification information of the target case; identifying case information associated with the target case from the case information associated with the plurality of cases based on the identification information of the target case; determining a plurality of members satisfying one or more conditions for reviewing the target case based on the identity information of the user and the case information associated with the target case; providing a review channel for reviewing the target case to each of one or more computing devices respectively associated with one or more of the determined members; receiving, from the one or more computing devices associated with the one or more of the determined members, case review data generated from review of the target case; and uploading the case review data to the blockchain node.

Optionally, the method may further comprise obtaining the identity information of the user and the identification information of the target case in the case review request, and uploading, according to a preset data model, the identity information of the user and the identification information of the target case to the blockchain node.

Optionally, the method may further comprise sending a plurality of invitations to the plurality of determined members for participating in case review, and receiving a confirmation from each of the one or more of the determined members.

Optionally, providing a review channel for reviewing the target case to each of one or more computing devices respectively associated with one or more of the determined members may comprise displaying the case information of the target case in the review channel.

Optionally, determining a plurality of members satisfying one or more conditions for reviewing the target case may comprise sending a case review authorizing request to the blockchain node, the case review authorizing request carrying unique identification information of the determined members, and receiving an authorization result notification returned by the blockchain node.

Optionally, determining a plurality of members satisfying one or more conditions for reviewing the target case may comprise identifying a plurality of members each having one or more characteristics similar to the user.

Optionally, the method may further comprise subsequent to uploading the case review data to the blockchain node, closing the review channel for each of the one or more computing devices associated with the one or more of the determined members.

According to another aspect of the embodiments of the specification, a blockchain-based data processing method is provided. The method may comprise: receiving a case review request, the case review request carrying identity information of a user and identification information of a to-be-reviewed case; determining a program member satisfying a review condition according to the identity information of the user and the identification information of the to-be-reviewed case; providing the program member satisfying the review condition with a review channel for reviewing the to-be-reviewed case; and receiving case review data generated from the review of the to-be-reviewed case by the program member, and uploading the case review data to a blockchain node.

Optionally, the blockchain-based data processing method further comprises: obtaining the identity information of the user and the identification information of the to-be-reviewed case carried in the case review request; and uploading, according to a preset data model, the identity information of the user and the identification information of the to-be-reviewed case to the blockchain node.

Optionally, before the receiving a case review request, the method further comprises: pulling case information from the blockchain node according to a preset pulling manner and storing the case information locally.

Optionally, the determining a program member satisfying a review condition according to the identity information of the user and the identification information of the to-be-reviewed case comprises: locally obtaining information of the to-be-reviewed case according to the identity information of the user and the identification information of the to-be-reviewed case; and determining an eligible program member according to the identity information of the user and the information of the to-be-reviewed case, and treating the eligible program member as a first case review member.

Optionally, the providing the program member satisfying the review condition with a review channel for reviewing the to-be-reviewed case comprises: sending an invite to participate in the case review to the first case review member, and treating a first case review member who responds with a confirmation to participate in the case review as a second case review member; and providing the second case review member with a review channel for reviewing the to-be-reviewed case, and displaying the information of the to-be-reviewed case in the review channel.

Optionally, the blockchain-based data processing method further comprises: sending a case review authorizing request to the blockchain node, the case review authorizing request carrying unique identification information of the second case review member; and receiving an authorization result notification returned by the blockchain node.

According to another aspect of the embodiments of the specification, a computing device is provided, comprising a memory, a processor, and a computer instruction stored on the memory and executable on the processor, wherein the processor, when executing the instruction, implements steps of the blockchain-based data processing method.

According to a third aspect of the embodiments of the specification, a non-transitory computer-readable storage medium for blockchain-based data processing, configured with instructions executable by one or more processors to cause the one or more processors to perform operations. The operations may comprise: obtaining, from a blockchain node, case information associated with a plurality of cases; receiving a request for reviewing a target case among the plurality of cases, the request comprising identity information of a user and identification information of the target case; identifying case information associated with the target case from the case information associated with the plurality of cases based on the identification information of the target case; determining a plurality of members satisfying one or more conditions for reviewing the target case based on the identity information of the user and the case information associated with the target case; providing a review channel for reviewing the target case to each of one or more computing devices respectively associated with one or more of the determined members; receiving, from the one or more computing devices associated with the one or more of the determined members, case review data generated from review of the target case; and uploading the case review data to the blockchain node.

According to another aspect of the embodiments of the specification, a computer readable storage medium storing a computer instruction is provided, wherein the instruction, when being executed by a processor, implements steps of the blockchain-based data processing method.

In the embodiments of the specification, a requesting client sends a case review request to a transaction terminal. The transaction terminal receives the case review request, determines program members satisfying one or more review conditions, provides the program members satisfying the review conditions with a review channel for reviewing the to-be-reviewed case or target case, receives case review data generated from the review of the target case by the program members, and uploads the case review data to a blockchain node. The server pulls the case review data from the blockchain node, determines a case review result according to the case review data, and returns the case review result to the requesting client. By uploading, by the transaction terminal, the case review data of the program member to the blockchain node, it guarantees the immutability of the case review data. The server may obtain the case review data directly from the blockchain node without the need to verify the accuracy of the review result, which effectively improves the work efficiency.

DETAILED DESCRIPTION

Many details are described below to facilitate thorough understanding of the specification. However, the specification may be implemented in many other manners different from the description herein. Those skilled in the art may make similar extensions without departing from the connotation of the specification. Therefore, the specification is not limited by the embodiments disclosed below.

Terms used in one or more embodiments of the specification are only for the purpose of describing particular embodiments, rather than limiting one or more embodiments of the specification. "A," "the," and "said" in the singular form used in one or more embodiments of the specification and the appended claims are intended to include the plural form as well, unless clearly indicated in the context to have other meanings. It should also be understood that the term "and/or" used in one or more embodiments of the specification refers to and includes any or all possible combinations of one or more associated listed items.

It should be understood that terms such as first, second, and the like may be used in one or more embodiments of the specification to describe various information, but the information shall not be limited to these terms. These terms are only used to differentiate information of the same type from each other. For example, without departing from the scope of one or more embodiments of the specification, first may also be referred to as second, and similarly, second may also be referred to as first. Depending on the context, the term "if" used here may be construed as "when . . . " or "at the time of . . . " or "in response to determination."

First of all, terms involved in one or more embodiments of the specification will be explained.

Mutual insurance: insurance activities that organizations or individuals having homogenous risk protection needs enter an agreement and pay premiums to form a mutual fund and become members of the mutual fund, and the fund is liable for compensations for losses caused by accidents stipulated in the agreement, or for insurance payments in case of death, disability, or diseases of an insured or when a condition, such as an age or term, stipulated in the agreement is satisfied.

Consortium chain: a plurality of pre-selected nodes inside a group are designated as bookkeepers, the generation of each block is jointly decided by all the pre-selected nodes, and any other companies or organizations may have limited access through an open application programming interface (API) of the blockchain.

A blockchain-based data processing system, method, computing device and computer readable storage medium are provided in the specification, and will be described in detail one by one in the following embodiments.

Figure 1:
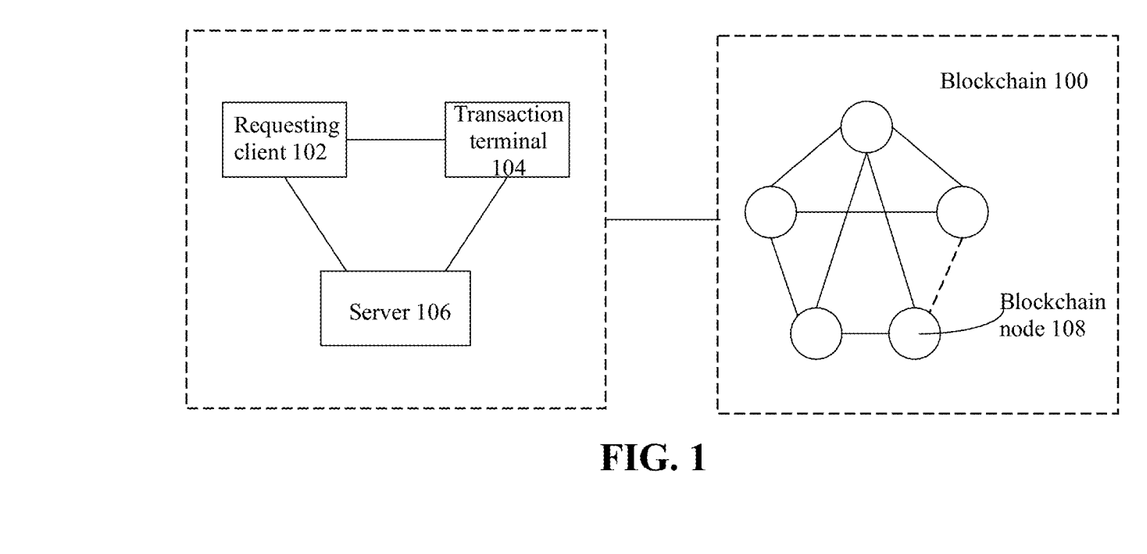
FIG. 1 is a schematic diagram of a blockchain-based data processing system according to some embodiments of the specification.

FIG. 1 is a schematic diagram of a blockchain-based data processing system according to some embodiments of the specification. The system comprises a requesting client 102, a transaction terminal 104, a server 106, and at least two blockchain nodes 108 on a blockchain 100.

The requesting client 102 is configured to send a request for reviewing a target case (i.e., a case review request) to the transaction terminal, the case review request carrying identity information of a user and identification information of the target case, such as a to-be-reviewed case.

The transaction terminal 104 is configured to obtain case information associated with a plurality of cases from a blockchain node, and to receive the case review request, wherein the target case is included in the plurality of cases. The transaction terminal 104 is further configured to identify case information associated with the target case from the case information associated with the plurality of cases based on the identification information of the target case, determine program members satisfying one or more review conditions for reviewing the target case according to the identity information of the user and the case information associated with the target case, and provide a review channel for reviewing the target case to the participating program members satisfying the review conditions. The transaction terminal 104 is further configured to receive case review data generated from the review of the target case from the participating program members, and upload the case review data to the blockchain node 108. Herein, each of the program members or users may be associated with one or more computing devices, and the communications with the each of the users or program members may be conducted through the computing devices associated therewith.

The server 106 is configured to pull the case review data from the blockchain node, determine a case review result according to the case review data, and return the case review result to the requesting client.

In some embodiments of the specification, the transaction terminal is further configured to obtain the identity information of the user and the identification information of the target case carried in the case review request, and upload, according to a preset data model, the identity information of the user and the identification information of the target case to the blockchain node; and the blockchain node is configured to receive the identity information of the user and the identification information of the target case, update review status information corresponding to the target case, and broadcast the identity information of the user, the identification information of the target case, and the corresponding review status information to other blockchain nodes.

In some embodiments of the specification, the blockchain node is further configured to obtain a review status corresponding to the target case according to the identity information of the user and the identification information of the target case. If the review status corresponding to the target case is not reviewed or pending review, update the review status to under review. If the review status corresponding to the target case is under review or review complete, send prompt information of an abnormal review status to the transaction terminal.

In some embodiments of the specification, the server is further configured to upload case information of the user to the blockchain node; the blockchain node is further configured to receive and store the case information; and the transaction terminal is further configured to pull the case information from the blockchain node according to a preset pulling manner and store the case information locally.

In some embodiments of the specification, the transaction terminal is further configured to locally obtain information of the target case according to the identity information of the user and the identification information of the target case; determine eligible program members according to the identity information of the user and the information of the target case, and set the eligible program members as first case review members; and send invitations to participate in the case review to the first case review members, and set a first case review member who responds with a confirmation to participate in the case review as a second case review member.

In some embodiments of the specification, the transaction terminal is further configured to provide the second case review member with a review channel and the information of the target case, receive case review data generated from the review of the information of the target case by the second case review member, and upload the review data to the blockchain node.

In some embodiments of the specification, the transaction terminal is further configured to send a case review authorizing request to the blockchain node, the case review authorizing request carrying unique identification information of the second case review member; and the blockchain node is further configured to receive the case review authorizing request, the case review authorizing request carrying the unique identification information of the second case review member, verify the unique identification information of the second case review member, and when the verification is successful, send a notification of successful authorization to the transaction terminal.

In some embodiments of the specification, the server is further configured to obtain the case review data, and determine a percentage of the number of review data with the review results with an approval in the total number of the review data. If the percentage is greater than a preset threshold, the review result indicates that the review is successful, If the percentage is lower than or equal to the preset threshold, the review result indicates that the review is unsuccessful or failure. If the review result is that the review is unsuccessful, send the review result to the requesting client.

In some embodiments of the specification, the server is further configured to process, if the review result is that the review is successful, the case of the user according to the data in the information of the target case.

In some embodiments of the specification, the server is further configured to send the case review result to the blockchain node; and the blockchain node is further configured to receive the case review result, update the review status of the case of the user, and broadcast the updated case status information to other blockchain nodes.

In some embodiments of the specification, after the case review by the second case review member at the transaction terminal is ended or terminated, the transaction terminal uploads the case review data to the blockchain node, to ensure the accuracy of the case review data by the immutability of the blockchain node. When processing the case, the server may obtain the case review data directly from the blockchain node, and determine a review result according to the case review data, such that the server does not need to determine or verify the accuracy of the case review data, the case processing time is shortened, and the case processing efficiency is improved.

Figure 2:
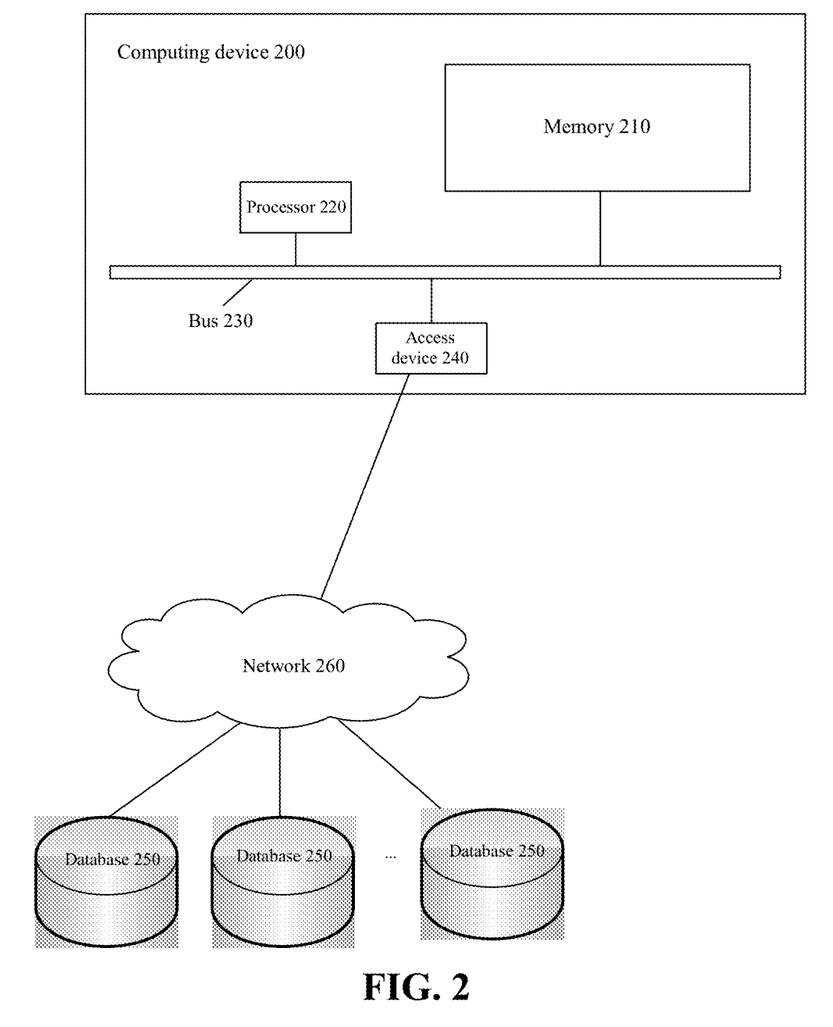
FIG. 2 is a structural block diagram of a computing device according to some embodiments of the specification.

FIG. 2 is a structural block diagram of a computing device 200 according to some embodiments of the specification. The computing device 200 comprises components that include, but are not limited to, a memory 210 and a processor 220. The processor 220 and the memory 210 are connected via a bus 230, and a database 250 is configured to store data.

The computing device 200 further comprises an access device 240. The access device 240 enables the computing device 200 to communicate via one or more networks 260. Examples of these networks include a public switched telephone network (PSTN), a local area network (LAN), a wide area network (WAN), a personal area network (PAN), or a combination of communication networks like the Internet. The access device 240 may comprise one or more of any type of wired or wireless network interfaces (e.g., one or more of network interface cards (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, etc.

In some embodiments of the specification, the above components of the computing device 200 and other components not shown in FIG. 2 may also be connected with each other, for example, via a bus. It should be understood that the structural block diagram of the computing device shown in FIG. 2 is only an example, rather than a limitation to the scope of the specification. Those skilled in the art may add or replace with other components as needed.

The computing device 200 may be a static or mobile computing device of any type, comprising a mobile computer or a mobile computing device (for example, a tablet computer, a personal digital assistant, a laptop computer, a notebook computer, a netbook, etc.), a mobile phone (for example, a smart phone), a wearable computing device (for example, a smart watch, smart glasses, etc.) or other types of mobile devices, or a static computing device, such as a desktop computer or PC. The computing device 200 may also be a mobile or static server.

Figure 3:
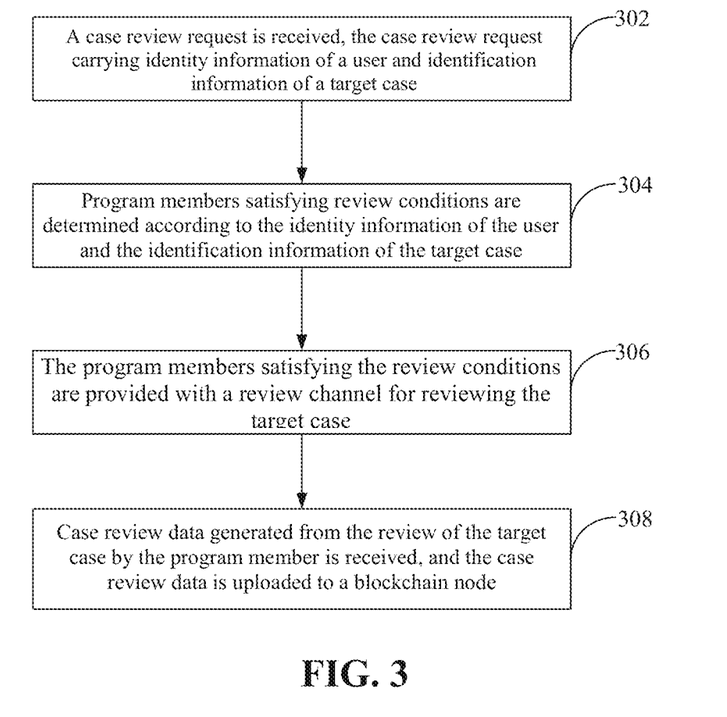
FIG. 3 is a flow chart of a blockchain-based data processing method according to some embodiments of the specification.

Here, the processor 220 may implement steps of the blockchain-based data processing method as shown in FIG. 3. FIG. 3 is a flow chart of a blockchain-based data processing method according to some embodiments of the specification. The method is applied to a transaction terminal and comprises Step 302 to Step 308.

In Step 302, a case review request is received, the case review request carrying identity information of a user and identification information of a target case.

In some embodiments of the specification, the user sends a case review request to a transaction terminal, the case review request carrying identity information of a user and identification information of a target case. Upon receiving the case review request, the transaction terminal uploads, according to a preset data model, the identity information of the user and the identification information of the target case carried in the case review request to a blockchain node. The preset data model is shown in Table 1.

TABLE 1

| Name | Age | Occupation | City | Identifier of a target case |
|---|---|---|---|---|
| User's name | User's age | User's occupation | The city where the user is in | Unique code corresponding to a target case |

In some embodiments of the specification, only the data model shown in Table 1 is used as an example for description. In practical applications, a data model may be determined according to practical needs.

Taking an insurance program as an example, an identifier of a target case of a user is the policy number of a target policy (i.e., a to-be-reviewed policy) of the user. The identity information of the user and the number of the target policy are uploaded, according to a data model shown in Table 2, to a blockchain node.

TABLE 2

| Name | Age | Occupation | City | Identifier of a target case |
|---|---|---|---|---|
| User A | 35 | Architect | Shanghai | ZX0110100003 |

Upon receiving the identity information of the user and the number of the target policy, the blockchain node obtains review status information corresponding to the target policy according to the identity information of the user and the number of the target policy. If the review status corresponding to the target policy is not reviewed, the review status is updated to under review, and the identity information of the user, the number of the target policy, and the corresponding updated review status information are broadcasted, via a consensus mechanism, to other blockchain nodes. If the review status corresponding to the target policy is under review or reviewed, prompt information of an abnormal review status is sent to the transaction terminal.

In some embodiments of the specification, the server uploads case information of the user to the blockchain node. Before receiving the case review request, the transaction terminal pulls the case information from the blockchain node according to a preset pulling manner and stores the case information locally. Here, there two manners in which the transaction terminal pulls data from the blockchain node, i.e., active pulling and monitored pulling. The active pulling manner means that data of a node on a chain is pulled and written locally at a certain time interval or periodically. The monitored pulling manner means that block generation information of a blockchain is monitored for pulling node data and writing the node data into a local database. During the data pulling process, the block data pulled each time is determined by a block height. For example, when 5,000 blocks (i.e., the 1st-5,000th blocks) have been pulled previously and the block height is increased to 5,100 after a certain time interval, only information of the newly added 100 blocks (i.e., the 5,001st-5,100th blocks) will be pulled during the next pulling, to effectively avoid repeated data pulling.

In Step 304, program members satisfying review conditions are determined according to the identity information of the user and the identification information of the target case.

In some embodiments of the specification, information of the target case is locally obtained according to the identity information of the user and the identification information of the target case. Taking the insurance program as an example, assuming that the identity information of the user and the identification information of the target case are as follows: user H, 50 years old, chef, the location being Beijing, and the policy number being BZ201705020017, the policy information and medical treatment information of the user are obtained according to the above information, from the transaction terminal, as shown in Table 3.

TABLE 3

Name: user H

| Policy information | | Medical treatment information | |
|---|---|---|---|
| Policy number | BZ201705020017 | Hospital of Medical treatment | Beijing Hospital C |
| Purchased insurance | Health insurance B | Time of Medical treatment | Feb. 28, 2019 to Mar. 20, 2019 |
| Purchase time | May 2, 2017 | Type of Medical treatment | In-patient |
| Insured Amount | 300,000 | Department of Medical treatment | Orthopedics |

In some embodiments of the specification, after the policy information and medical treatment information of the user H are obtained, one or more eligible program members are determined according to the identity information, the policy information, and the medical treatment information of the user H, and the eligible program members are set as first case review members. In a mutual insurance program, case review members are members of the mutual insurance program who have purchased the insurance. An optional method for determining eligible program members is to determine first case review members according to the identity information and the policy information of the user. For example, if the user H is 50 years old, has an occupation of chef, and has a location of Beijing, then 50-year old chefs in Beijing may be selected as first case review members. Or, if the insurance purchased by the user is a health insurance B, then program members who have selected to purchase this insurance may be selected as first case review members.

In an application, a method for determining one or more first case review members may be determined according to practical needs.

In Step 306, the program members satisfying the review conditions are provided with a review channel for reviewing the target case.

Figure 4:
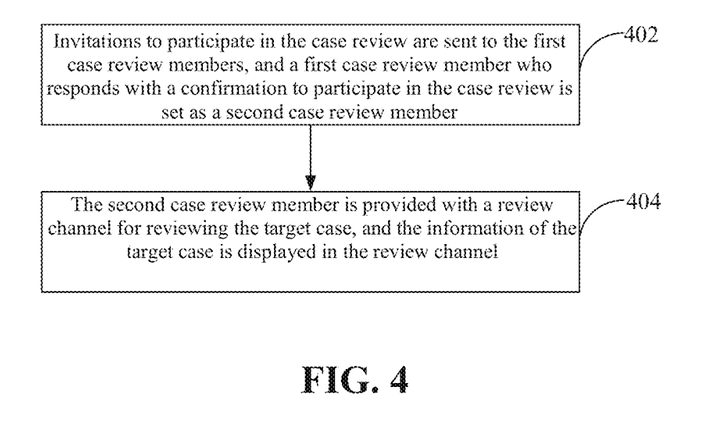
FIG. 4 is a flow chart of a blockchain-based data processing method according to some embodiments of the specification.

In some embodiments of the specification, the Step 306 may be implemented through steps shown in FIG. 4, comprising Step 402 to Step 404.

In Step 402, invitations to participate in the case review are sent to the first case review members, and a first case review member who responds with a confirmation to participate in the case review is set as a second case review member.

In some embodiments of the specification, after the first case review members are determined, the transaction terminal sends the invitations to participate in the case review to the first case review members, and sets a first case review member who responds with a confirmation to participate in the case review as a second case review member. When the number of second case review members reaches a preset threshold N, the transaction terminal stops sending the invitation to participate in the case review to the first case review members.

After the transaction terminal has determined the one or more second case review members, the transaction terminal sends case review authorizing requests of the second case review members to the blockchain node, the case review authorizing request carrying unique identification information of a second case review member. The blockchain node verifies the identity of the second case review members through the unique identification information to ensure that the second case review members are the program members. After the verification is completed, the blockchain node sends an authorization result to the transaction terminal. When the authorization results are successful authorization, the method may proceed to perform the step of providing the second case review members with a review channel in Step 404.

In Step 404, the second case review member is provided with a review channel for reviewing the target case, and the information of the target case is displayed in the review channel.

In some embodiments of the specification, after the second case review members successfully obtain the case review authorization, the information of the target case is reviewed in the case review channel provided by the transaction terminal, wherein the information of the target case is displayed in the case review channel Taking the insurance program as an example, detailed content of the information of the target case is shown in Table 3, and the second case review members review the information of the target case.

In some embodiments of the specification, the review channel is a case information review platform provided by a third-party service platform to the second case review member. The information of the target case of the user is displayed through an interface of the case information review platform. The second case review members review the information of the target case of the user through the case information review platform, and submit case review data on the interface of the case information review platform. To prevent the second case review members from repeatedly reviewing the information of the target case, the transaction terminal closes the review channel provided to the second case review members while uploading the case review data to the blockchain node.

In some embodiments of the specification, the transaction terminal sends the identity information of the second case review members who respond with a confirmation to participate in the case review to the blockchain node for identity verification, provides a review channel to the second case review members who are successful in the identity verification, and ensures that all the second case review members who participate in the case review are the program members, for ensuring a more accurate case review result.

In Step 308, case review data generated from the review of the target case by the program member is received, and the case review data is uploaded to a blockchain node.

In some embodiments of the specification, after the second case review member complete the review, the transaction terminal uploads the case review data to the blockchain node, wherein the case review data contains the identity information of the second case review member.

In some embodiments of the specification, after all of the N second case review members have completed the case review, the server obtains N pieces of the case review data from the blockchain node, and determines a case review result according to the N pieces of the case review data. For example, a percentage of the number of review data with the review result with an approval in the N pieces of the case review data in the total number of the review data is determined. Taking the threshold being 50% as an example, if the percentage of the number of review data with the review result with an approval in the N pieces of the case review data in the total number N is greater than 50%, the review result is that the review is successful. If the percentage of the number of review data with the review result with an approval in the N pieces of the case review data in the total number N is lower than or equal to 50%, the review result is that the review is unsuccessful. The transaction terminal sends the review result to the requesting client.

In some embodiments of the specification, only the threshold of 50% is used as an example. In practical applications, the preset threshold may be determined according to practical needs.

Taking an insurance program as an example, if the review result is that the review is successful, the server may determine an amount of claim settlement according to the policy information and medical treatment information in the information of the target case of the user, and complete the claim settlement for the user according to the amount of claim settlement.

In some embodiments of the specification, after the server has determined the case review result according to the case review data, the server sends the case review result to the blockchain node. Upon receiving the case review result, the blockchain node updates the review status of the case of the user, and broadcasts, via a consensus mechanism, the updated case status information to other blockchain nodes.

In some embodiments of the specification, the transaction terminal sends the identity information of the second case review member who responds with a confirmation to participate in the case review to the blockchain node for identity verification, provides a review channel to the second case review member who is successful in the identity verification, and ensures that all the second case review members who participate in the case review are the program members, for ensuring a more accurate case review result. The case review data of the second case review member is uploaded to the blockchain node, and the case review data carries the identity information of the second case review member, which ensures the openness and fairness of the case review. Due to the immutability of data in a blockchain, the server may obtain the case review data directly from the blockchain node when processing the case, and determine a review result according to the case review data, such that the server does not need to determine or verify the accuracy of the case review data, the case processing time is shortened, and the case processing efficiency is improved.

Figure 5:
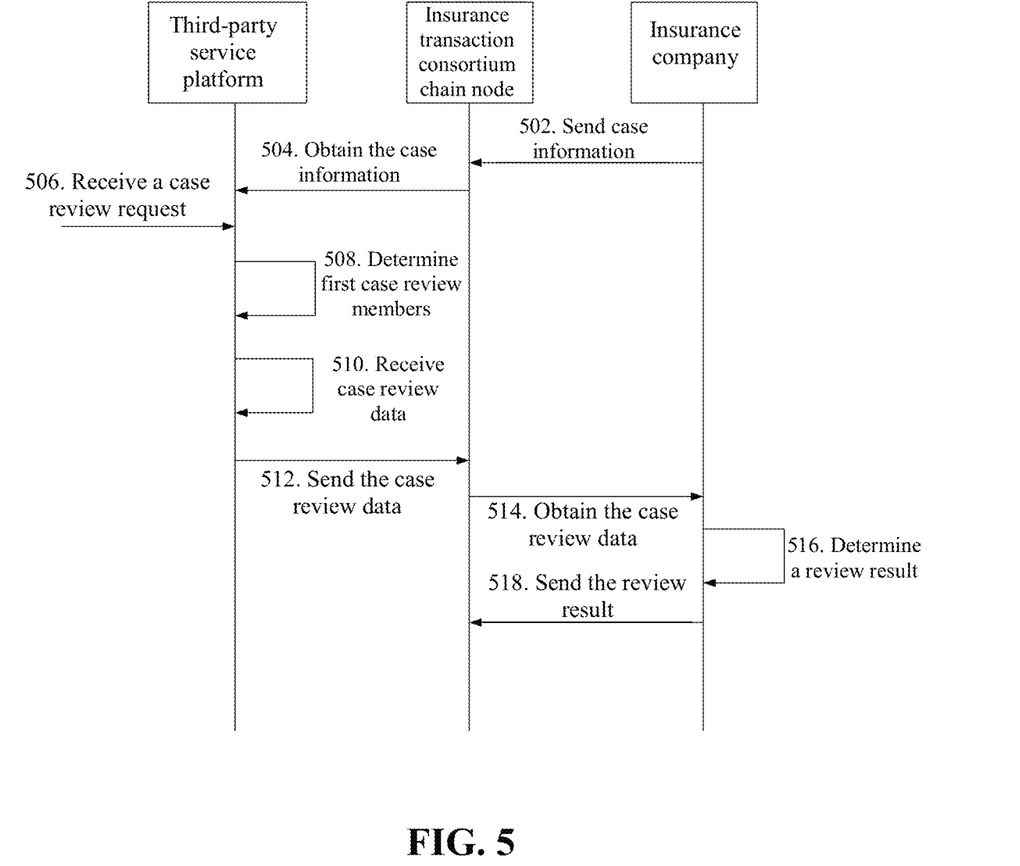
FIG. 5 is a schematic diagram of interactions using the blockchain-based data processing method in an application scenario of an insurance transaction consortium chain according to some embodiments of the specification.

FIG. 5 is a schematic diagram of interactions using the blockchain-based data processing method in an application scenario of an insurance transaction consortium chain according to some embodiments of the specification, which comprises Step 502 to Step 518.

In Step 502, an insurance company sends case information to an insurance transaction consortium chain node.

In some embodiments of the specification, after a user purchases an insurance, the insurance company sends the insurance information of the user to the insurance transaction consortium chain node.

In Step 504, a third-party service platform obtains the case information from the insurance transaction consortium chain node.

In some embodiments of the specification, the third-party service platform pulls data from the insurance transaction consortium chain node according to a preset pulling manner There two manners in which the third-party service platform pulls data from the insurance transaction consortium chain node, i.e., active pulling and monitored pulling. The active pulling manner means that data of a node on a chain is pulled and written locally at a certain time interval. The monitored pulling manner means that block generation information of the insurance transaction consortium chain node is monitored for pulling node data and writing the node data locally. During the data pulling process, block data pulled each time is determined by a block height. For example, when 5,000 blocks (i.e. the 1st-5,000th blocks) have been pulled previously and the block height is increased to 5,100 after a certain time interval, only information of the newly added 100 blocks (i.e. the 5,001st-5,100th blocks) will be pulled during the next pulling, which can effectively avoid repeated data pulling.

In Step 506, the third-party service platform receives a case review request.

In some embodiments of the specification, when an insured user has a claim, the user sends a review request to the third-party service platform. The review request carries identity information of the user and a policy number of the to-be-reviewed policy or target policy. If the review is successful, a payment may be obtained against the claim.

In Step 508, the third-party service platform determines first case review members.

In some embodiments of the specification, upon receiving the review request, the third-party service platform uploads, according to a preset data model, the identity information of the user and the policy number of the target policy carried in the review request to the insurance transaction consortium chain node. The insurance transaction consortium chain node determines a review status corresponding to the target policy according to the identity information of the user and the policy number of the target policy. If the review status of the target policy is not reviewed, the review status is updated to under review, and the identity information of the user, the policy number of the target policy, and the updated review status information are broadcasted, via a consensus mechanism, to other blockchain nodes. If the review status of the target policy is under review or reviewed, prompt information of an abnormal review status is sent to the third-party service platform.

In some embodiments of the specification, the third-party service platform locally obtains the policy information and medical treatment information of the user according to the identity information of the user and the policy number of the target policy, determines eligible program members according to the identity information, policy information and medical treatment information of the user, and sets the eligible program members as first case review members. The third-party service platform sends an invitation to participate in the case review to the first case review members, and sets a first case review member who responds with a confirmation to participate in the case review as a second case review member. When the number of second case review members reaches a preset threshold, the third-party service platform stops sending the invitation to first case review members.

In Step 510, the third-party service platform receives case review data.

In some embodiments of the specification, after the third-party service platform determines the second case review member, the third-party service platform sends a case review authorizing request to the insurance transaction consortium chain node, the case review authorizing request carrying identification information of the second case review member.

The insurance transaction consortium chain node verifies the identification information of the second case review member to ensure that the second case review member is a program member. After the verification is completed, the insurance transaction consortium chain node sends an authorization result to the third-party service platform. If the verification is successful, the authorization result is a successful authorization. If the verification is unsuccessful, the authorization result is a failed authorization. When the authorization result is a successful authorization, the third-party service platform provides the second case review member with a case review channel, and the medical treatment information and policy information of the user are all displayed in the review channel. The second case review member reviews the policy information and medical treatment information of the user in the review channel. After the review is completed, the third-party service platform obtains case review data submitted by the second case review member through the review channel.

In Step 512, the third-party service platform sends the case review data to the insurance transaction consortium chain node.

In some embodiments of the specification, assuming that there is a total of M second case review members, for each second case review member, the third-party service platform uploads the case review data of the second case review member to the insurance transaction consortium chain node and closes the review channel provided to the second case review member, wherein the case review data contains the identity information of the second case review member.

In Step 514, the insurance company receives the case review data from the insurance transaction consortium chain node.

In Step 516, the insurance company determines a review result.

In some embodiments of the specification, after all the M second case review members have completed the review of the policy information and medical treatment information of the user, and the third-party service platform has uploaded all the M pieces of case review data to the blockchain node, the insurance company pulls the M pieces of case review data from the insurance transaction consortium chain node, and determines a review result according to the M pieces of case review data. For example, a percentage of the number of review results with an approval of payment in the total number M of the M pieces of case review data is determined. If the percentage of the number of review results with an approval of payment in the total number M of the M pieces of case review data is greater than a preset threshold, the review result is that the review is successful. If the percentage of the number of review results with an approval of payment in the total number of the M pieces of case review data is lower than or equal to a preset threshold, the review result is that the review is unsuccessful.

In Step 518, the insurance company sends the review result to the insurance transaction consortium chain node.

In some embodiments of the specification, after the insurance company determines the review result, the insurance company publicizes the review result and sends the review result to the insurance transaction consortium chain node for storage. The user may search for the review result on his/her own through the third-party service platform. Alternatively, upon receiving the publicized review result, the third-party service platform may send prompt information of the review result to the user. If the review result is that the review is successful, the insurance company may determine an amount of claim settlement according to the policy information and medical treatment information in the information of the target case of the user, and complete the claim settlement for the user according to the amount of claim settlement.

In some embodiments of the specification, after the insurance company determines the case review result according to the case review data, the insurance company sends the case review result to the user and the insurance transaction consortium chain node, respectively. Upon receiving the case review result, the insurance transaction consortium chain node updates the review status of the case of the user, i.e., changes the review status to reviewed, and broadcasts, via a consensus mechanism, the updated case status information to other blockchain nodes. If the review result is that the review is successful, the insurance company may determine a settlement amount according to the policy information and medical treatment information of the user, and complete the claim settlement for the user according to the settlement amount.

In some embodiments of the specification, the insurance transaction consortium chain node updates the review status of the policy number of the user, which can prevent the user from initiating a review request repeatedly and causing extra review work for the third-party service platform. It is beneficial for improving work efficiency. By uploading the case review data to the insurance transaction consortium chain node, it guarantees the accuracy and immutability of the case review data. When performing claim settlement operations on the user, the insurance company may obtain the review data directly from the insurance transaction consortium chain node without the need to verify the review result, which effectively improves the claim settlement efficiency.

In some embodiments of the specification, a computing device is further provided, comprising a memory, a processor, and a computer instruction stored on the memory and executable on the processor, wherein the processor, when executing the instruction, implements steps of the above-described blockchain-based data processing method.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

In some embodiments of the specification, a computer readable storage medium storing a computer instruction is further provided, wherein the instruction, when being executed by a processor, implements steps of the above-described blockchain-based data processing method. When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

A solution of the computer readable storage medium according to some embodiments is described above. The technical solution of the storage medium and the technical solution of the above-described blockchain-based data processing method belong to the same concept. For any details of the technical solution of the storage medium that are not described in detail, reference may be made to the above description of the technical solution of the blockchain-based data processing method.

Particular embodiments of the specification are described above, and other embodiments fall within the scope of the appended claims. In some cases, actions or steps stated in the claims may be executed in an order different from those in the embodiments and can still achieve desired results. In addition, a process depicted in the accompanying drawings does not necessarily require the illustrated particular order or continuous order to achieve desired results. In some embodiments, multi-task processing and parallel processing may be feasible or may be beneficial.

The computer instruction comprises computer program codes, and the computer program codes may be in the form of source code, object code, executable file or some intermediate forms. The computer readable medium may include any entity or device capable of carrying the computer program codes, a record medium, a USB stick, a portable hard drive, a magnetic disk, an optical disc, a computer memory, a Read Only Memory (ROM), a Random Access Memory (RAM), an electric carrier wave signal, a telecommunication signal, and a software distribution medium. The content contained in the computer readable medium may be properly added or deleted as required by legislative and patent practices in jurisdictions. For example, in some jurisdictions, the computer readable medium does not include electric carrier wave signals or telecommunication signals according to legislative and patent practices.

For simple description, the above-described method embodiments are all expressed as a series of action combinations. However, those skilled in the art should be aware that the specification is not limited by the described order of actions, as according to the specification, some steps may be implemented in other orders or simultaneously. Second, those skilled in the art should also be aware that all the embodiments described in the specification are a portion of the embodiments, and not all the involved actions and modules are necessarily required by the specification.

The above embodiments are described with various focuses. For a part of an embodiment that is not described in detail, the relevant description of other embodiments may be referenced.

The embodiments of the specification disclosed above are merely used to help describe the specification. Optional embodiments do not thoroughly describe all details or limit the specification only to the described embodiments. Many modifications and variations may be made according to the content of the specification. The specification selects and describes these embodiments in detail for the purpose of better explaining principles and applications of the specification, so that those skilled in the art can better understand and use the specification. The specification is only subject to the claims and the full scope and equivalents of the claims.

What is claimed is:

1. A blockchain-based data processing method for improving accuracy and efficiency of case review, comprising:
   obtaining, by a transaction terminal from a blockchain node associated with a blockchain, case information associated with a plurality of cases, wherein the obtaining comprises:
      monitoring block generation information of the blockchain,
      pulling data from a plurality of blocks within a range of block height in the blockchain, and
      storing the pulled data in a local database;
   receiving, by the transaction terminal, a request for reviewing a target case among the plurality of cases, the request comprising identity information of a user and identification information of the target case;
   identifying, by the transaction terminal, case information associated with the target case from the case information associated with the plurality of cases based on the identification information of the target case;
   determining, by the transaction terminal, a plurality of members satisfying one or more conditions for reviewing the target case based on the identity information of the user and the case information associated with the target case;
   providing, by the transaction terminal via a third-party service platform, a review channel for reviewing the target case to each of one or more computing devices respectively associated with one or more of the determined members, the review channel comprising an interface of the third-party service platform displaying the case information associated with the target case;
   receiving, by the transaction terminal via the interface of the third-party service platform from the one or more computing devices associated with the one or more of the determined members, case review data generated from review of the target case and indicating whether each of the one or more of the determined members approves the target case; and
   uploading, by the transaction terminal, the case review data to the blockchain node, causing the blockchain node to broadcast the case review data to a plurality of other blockchain nodes for storing in the blockchain via a consensus mechanism.

2. The method of claim 1, further comprising:
obtaining the identity information of the user and the identification information of the target case in the case review request; and
uploading, according to a preset data model, the identity information of the user and the identification information of the target case to the blockchain node.

3. The method of claim 1, further comprising:
sending a plurality of invitations to the plurality of determined members for participating in case review; and
receiving a confirmation from each of the one or more of the determined members.

4. The method of claim 1, wherein the determining a plurality of members satisfying one or more conditions for reviewing the target case comprises:
sending a case review authorizing request to the blockchain node, the case review authorizing request carrying unique identification information of the determined members; and
receiving an authorization result notification returned by the blockchain node.

5. The method of claim 1, wherein the determining a plurality of members satisfying one or more conditions for reviewing the target case comprises:
identifying a plurality of members each having one or more characteristics similar to the user.

6. The method of claim 1, further comprising:
subsequent to uploading the case review data to the blockchain node, closing the review channel for each of the one or more computing devices associated with the one or more of the determined members.

7. A system associated with a transaction terminal for blockchain-based data processing for improving accuracy and efficiency of case review, comprising a processor and a non-transitory computer-readable storage medium storing instructions executable by the processor to cause the system to perform operations comprising:
obtaining, from a blockchain node associated with a blockchain, case information associated with a plurality of cases, wherein the obtaining comprises:
monitoring block generation information of the blockchain,
pulling data from a plurality of blocks within a range of block height in the blockchain, and
storing the pulled data in a local database;
receiving a request for reviewing a target case among the plurality of cases, the request comprising identity information of a user and identification information of the target case;
identifying case information associated with the target case from the case information associated with the plurality of cases based on the identification information of the target case;
determining a plurality of members satisfying one or more conditions for reviewing the target case based on the identity information of the user and the case information associated with the target case;
providing, via a third-party service platform, a review channel for reviewing the target case to each of one or more computing devices respectively associated with one or more of the determined members, the review channel comprising an interface of the third-party service platform displaying the case information associated with the target case;
receiving, via the interface of the third-party service platform from the one or more computing devices associated with the one or more of the determined members, case review data generated from review of the target case and indicating whether each of the one or more of the determined members approves the target case; and
uploading the case review data to the blockchain node, causing the blockchain node to broadcast the case review data to a plurality of other blockchain nodes for storing in the blockchain via a consensus mechanism.

8. The system of claim 7, wherein the operations further comprise:
obtaining the identity information of the user and the identification information of the target case in the case review request; and
uploading, according to a preset data model, the identity information of the user and the identification information of the target case to the blockchain node.

9. The system of claim 7, wherein the operations further comprise:
sending a plurality of invitations to the plurality of determined members for participating in case review; and
receiving a confirmation from each of the one or more of the determined members.

10. The system of claim 7, wherein the determining a plurality of members satisfying one or more conditions for reviewing the target case comprises:
sending a case review authorizing request to the blockchain node, the case review authorizing request carrying unique identification information of the determined members; and
receiving an authorization result notification returned by the blockchain node.

11. The system of claim 7, wherein the determining a plurality of members satisfying one or more conditions for reviewing the target case comprises:
identifying a plurality of members each having one or more characteristics similar to the user.

12. The system of claim 7, further comprising:
subsequent to uploading the case review data to the blockchain node, closing the review channel for each of the one or more computing devices associated with the one or more of the determined members.

13. A non-transitory computer-readable storage medium associated with a transaction terminal for blockchain-based data processing for improving accuracy and efficiency of case review, configured with instructions executable by one or more processors to cause the one or more processors to perform operations comprising:
obtaining, from a blockchain node associated with a blockchain, case information associated with a plurality of cases, wherein the obtaining comprises:
monitoring block generation information of the blockchain,
pulling data from a plurality of blocks within a range of block height in the blockchain, and
storing the pulled data in a local database;
receiving a request for reviewing a target case among the plurality of cases, the request comprising identity information of a user and identification information of the target case;

identifying case information associated with the target case from the case information associated with the plurality of cases based on the identification information of the target case;

determining a plurality of members satisfying one or more conditions for reviewing the target case based on the identity information of the user and the case information associated with the target case;

providing, via a third-party service platform, a review channel for reviewing the target case to each of one or more computing devices respectively associated with one or more of the determined members, the review channel comprising an interface of the third-party service platform displaying the case information associated with the target case;

receiving, via the interface of the third-party service platform from the one or more computing devices associated with the one or more of the determined members, case review data generated from review of the target case and indicating whether each of the one or more of the determined members approves the target case; and uploading the case review data to the blockchain node, causing the blockchain node to broadcast the case review data to a plurality of other blockchain nodes for storing in the blockchain via a consensus mechanism.

14. The medium of claim 13, wherein the operations further comprises:

obtaining the identity information of the user and the identification information of the target case in the case review request; and uploading, according to a preset data model, the identity information of the user and the identification information of the target case to the blockchain node.

15. The medium of claim 13, wherein the operations further comprises:

sending a plurality of invitations to the plurality of determined members for participating in case review; and receiving a confirmation from each of the one or more of the determined members.

16. The medium of claim 13, wherein the determining a plurality of members satisfying one or more conditions for reviewing the target case comprises:

sending a case review authorizing request to the blockchain node, the case review authorizing request carrying unique identification information of the determined members; and receiving an authorization result notification returned by the blockchain node.

17. The medium of claim 13, further comprising:

subsequent to uploading the case review data to the blockchain node, closing the review channel for each of the one or more computing devices associated with the one or more of the determined members.

18. The medium of claim 13, wherein the determining a plurality of members satisfying one or more conditions for reviewing the target case comprises:

identifying a plurality of members each having one or more characteristics similar to the user.

* * * * *